United States Patent
White et al.

(10) Patent No.: US 10,721,323 B2
(45) Date of Patent: Jul. 21, 2020

(54) HIGH-PERFORMANCE DATA STREAMING

(71) Applicant: salesforce.com, inc., San Francisco, CA (US)

(72) Inventors: Seth John White, San Francisco, CA (US); Guillaume Le Stum, San Francisco, CA (US); Benjamin Shaw, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 3 days.

(21) Appl. No.: 16/225,897

(22) Filed: Dec. 19, 2018

(65) Prior Publication Data

US 2019/0387068 A1  Dec. 19, 2019

Related U.S. Application Data

(60) Provisional application No. 62/687,199, filed on Jun. 19, 2018.

(51) Int. Cl.
| | |
|---|---|
| *G06F 15/16* | (2006.01) |
| *H04L 29/08* | (2006.01) |
| *G06F 16/182* | (2019.01) |
| *G06F 16/901* | (2019.01) |
| *H04L 29/06* | (2006.01) |

(52) U.S. Cl.
CPC ........ *H04L 67/288* (2013.01); *G06F 16/1824* (2019.01); *G06F 16/9024* (2019.01); *H04L 65/605* (2013.01); *H04L 67/1097* (2013.01)

(58) Field of Classification Search
CPC . H04L 67/288; H04L 65/605; H04L 67/1097; G06F 16/1824; G06F 16/9024
See application file for complete search history.

(56) References Cited

U.S. PATENT DOCUMENTS

| | | | |
|---|---|---|---|
| 5,555,368 A * | 9/1996 | Orton | G06F 8/24 715/807 |
| 5,577,188 A | 11/1996 | Zhu | |
| 5,608,872 A | 3/1997 | Schwartz | |
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |

(Continued)

*Primary Examiner* — Razu A Miah
(74) *Attorney, Agent, or Firm* — Dergosits & Noah LLP; Todd A. Noah

(57) ABSTRACT

High performance data streaming is provided. An intermediate iterator receives a request to process streaming data in a parent request buffer from a parent iterator. The intermediate iterator sends a request to provide a batch of the streaming data in a request child buffer to a child iterator. The intermediate iterator receives the batch of the streaming data in a child response buffer from the child iterator. The intermediate iterator processes the batch of the streaming data. The intermediate iterator sends the processed batch of the streaming data in a response parent buffer to the parent iterator.

17 Claims, 8 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,204,856 B2 * | 6/2012 | Meyer .................. G06F 16/972 |
| | | 707/623 |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0108414 A1 * | 5/2005 | Taylor ............... H04L 29/06027 |
| | | 709/231 |
| 2006/0041661 A1 * | 2/2006 | Erikson ............... G06F 21/6227 |
| | | 709/225 |
| 2009/0063415 A1 * | 3/2009 | Chatfield ................. G06F 9/542 |
| 2009/0100342 A1 | 4/2009 | Jakobson |
| 2009/0177744 A1 | 7/2009 | Marlow et al. |
| 2011/0145429 A1 * | 6/2011 | Krishnamurthy ..... G06F 9/5044 |
| | | 709/231 |
| 2012/0233137 A1 | 9/2012 | Jakobson et al. |
| 2012/0265853 A1 * | 10/2012 | Knox .................. H04N 21/2187 |
| | | 709/218 |
| 2013/0144988 A1 * | 6/2013 | Tan ..................... H04L 12/1868 |
| | | 709/219 |
| 2013/0159543 A1 * | 6/2013 | Yandek ...................... G06F 8/65 |
| | | 709/231 |
| 2013/0218948 A1 | 8/2013 | Jakobson |
| 2013/0218949 A1 | 8/2013 | Jakobson |
| 2013/0218966 A1 | 8/2013 | Jakobson |
| 2013/0268620 A1 * | 10/2013 | Osminer ............... H04N 21/251 |
| | | 709/217 |
| 2014/0082125 A1 * | 3/2014 | van Coppenolle ........................ |
| | | H04L 67/2842 |
| | | 709/213 |
| 2014/0344392 A1 * | 11/2014 | Ozawa ............... H04N 21/6131 |
| | | 709/213 |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |

(56) References Cited

U.S. PATENT DOCUMENTS

2015/0207846 A1* 7/2015 Famaey ................. H04L 67/02
709/219
2015/0312124 A1* 10/2015 Curtin ................. H04L 43/0876
709/224

* cited by examiner

HIGH-PERFORMANCE DATA STREAMING

CROSS REFERENCE TO RELATED APPLICATION

This application claims priority under 35 U.S.C. § 119 or the Paris Convention from U.S. Provisional Patent Application 62/687,199, filed Jun. 19, 2018, the entire contents of which is incorporated herein by reference as if set forth in full herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

A query processor may be referred to as a query graph interpreter, or an interpreter for short. An instance of an interpreter may have a hierarchical graph-like structure that includes nodes which represent the specific operations (such as scanning, grouping, aggregating, and projecting) required by the query being executed, with the shape of the instance of the interpreter being specific to the query that is being executed. The graph's nodes may be referred to as "iterators" because they are implemented by a uniform iterator interface. An iterator can be an object that enables the traversal of a container, which is a grouping of a variable number of data items that have some shared significance to a problem being solved and need to be operated upon together in some controlled fashion, such as a stream of data elements. The data contained in a stream may be in either inverted or direct format. The ability to efficiently stream data between iterators is a key to providing high-performance for queries that are executed using a query engine. Data streams for a single query may contain hundreds of millions of data elements, and this number is expected to increase to many billions of data elements.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 11:
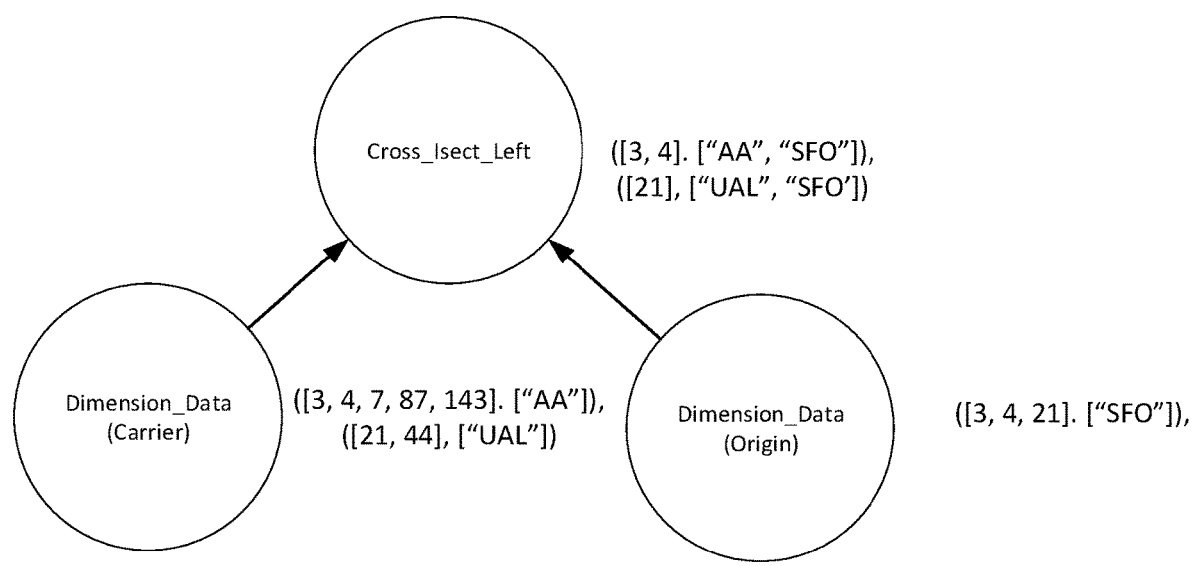
FIG. 11 illustrates an example binary Cross_Isect_Left iterator.

As illustrated in FIG. 11, the example binary Cross_I-sect_Left iterator, which performs grouping, has two child nodes which each provide this iterator with a stream of data that is to be further grouped. Logically, the record set of each streaming data element coming from the left child is intersected with all of the streaming data elements coming from the right child to produce a refined grouping. In this example the child nodes are Dimension_Data nodes, but they could be any type of node, in general. The streams connecting the nodes in this example contain inverted data.

This simple example raises the following questions. 1. What is the granularity at which streaming data flows between iterators? 2. What assumptions can a parent iterator make about the amount of streaming data returned by a child iterator? 3. What is responsible for allocating the memory used to hold streaming data? 4. When does streaming data need to be copied? 5. Can the memory allocated to hold streaming data be reused? 6. What is the lifetime/scope of streaming data? The answers to these questions are determined to a large extent by what type of performance the interpreter will have.

In accordance with embodiments described herein, there are provided methods and systems for high-performance data streaming. An intermediate iterator receives a request to process streaming data in a parent request buffer from a parent iterator. The intermediate iterator sends a request to provide a batch of the streaming data in a request child buffer to a child iterator. The intermediate iterator receives the batch of the streaming data in a child response buffer from the child iterator. The intermediate Aerator processes the batch of the streaming data. The intermediate iterator sends the processed batch of the streaming data in a response parent buffer to the parent iterator.

For example, a DimValueRows iterator is initialized by its parent iterator, initializes its child iterator, conveys the parent iterator's request to allocate a buffer to its child iterator, and passes a pointer to the buffer C1 from its child iterator to its parent iterator. The DimValueRows iterator receives a request from its parent iterator to process streaming data elements in the parent iterator's buffer C1, requests its child iterator to provide streaming data in its parent iterator's buffer C1, and receives a batch of streaming data from its child iterator in its parent iterator's buffer C1. The DimValueRows iterator processes the batch of streaming data elements in its parent iterator's buffer C1, and then sends the processed batch of streaming data elements in its parent iterator's buffer C1 to its parent iterator.

Methods and systems are provided for high-performance data streaming. First, a method for high-performance data streaming will be described with reference to example embodiments. Then a system for high-performance data streaming will be described.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

The iterator application programming interface (API) is implemented by all iterators. There are small syntactic differences between iterators that return direct versus inverted data, but there is no significant difference in the behavior of these iterators. Inverted data types are used in the examples below. The syntax of the go programming languages is also used without the loss of generality, although embodiments of the disclosure may use any suitable programming language.

Iterator
Initialize(context Context) error
NewChunk( )*InvertedStreamData
Next(*InvertedStreamData) (*InvertedStreamData, error)
Reset( ) error
Close( ) error
AxesCount( ) int
GroupingKeyCount( ) int
ValuesCount( ) int
Profile(buf*bytes.Buffer, level int)
Context( ) Context The Initialize method is the first method that is called following the creation of an iterator. Once the Initialize method completes successfully, the initialized iterator is ready to return streaming data. The Initialize method takes a context parameter which contains global information that an initialized iterator needs to execute a particular query. Iterators are responsible for initializing their children iterators, which is typically the first action completed during the Initialize method, such that initialization is recursive. Once the Initialize method has completed, the metadata methods are also enabled, and may be used to determine the shape of the streaming data that the initialized iterator returns. For inverted data, the metadata methods are the AxesCount, GroupingKeyCount, and ValuesCount methods.

The NewChunk method is available following successful initialization. The NewChunk method returns a pre-allocated container that can hold streaming data. The NewChunk method is used by an iterator to obtain a container that may be passed to the Next method. The container can only be filled with data by the iterator that created the container.

The Next method returns streaming data to a parent iterator. Each successive call to the Next method returns additional streaming data elements in the order that the data elements appear in the stream. The caller iterator can determine the number of streaming data elements returned by examining the Used element of the StreamData object. The Next method excepts a StreamData parameter and returns a StreamData result.

A parent iterator and a child iterator cooperate in determining the lifecycle of a StreamData buffer and its reuse. The StreamData parameter of the Next method is used by a parent iterator to pass an existing StreamData buffer for a child iterator to fill. A parent iterator knows when a buffer has been consumed and, therefore, when it may be reused. Thus, a parent iterator is by default in charge of the lifecycle of the buffer which allows for efficient reuse of memory, and most child iterators simply return the passed in StreamData parameter filled with the next set of stream data elements.

Although a parent iterator passes a stream data buffer to a child iterator, a child iterator may choose to override a parent iterator's desire to reuse the buffer and return a different stream data buffer using the StreamData return value. This allows a child iterator to override, in effect, a parent iterator's expectation that the buffer that it passed will contain the result. For example, the override capability is useful for child iterators that produce results asynchronously. In this case, a child iterator returns a different result buffer, and adds the buffer parameter to a pool that it maintains for later reuse, as memory is always reused and allocation kept to a minimum, even in the asynchronous case. Consequently, a parent iterator must always assume that a child iterator may have returned a different StreamData buffer than the one that was passed to the child iterator because the parent iterator does not know the specific type of the child iterator.

The Reset method resets an iterator's data stream so that a subsequent call to the Next method returns data from the beginning of the data stream. The Reset method may be called any time after a successful call to the Initialize method.

The Close method informs an iterator that stream data processing is completed. The Close method allows an iterator to perform any needed cleanup. The Close method is called whenever the Initialize method is successful. The Close method is not called when the Initialize method fails for any reason.

The Profile method allows an iterator to return profile information about the execution, such as the execution time. The Context method informs an iterator whether profiling is enabled. The Profile method may be called any time after a successful call to the Initialize method.

The Context method is a utility method for obtaining the context object for an iterator. AxesCount, GroupingKeyCount, and ValuesCount are metadata methods that may be called to identify the inverted streaming data returned by an iterator. They are available following a successful call to the Initialize method.

Iterators need to process streaming data elements in batches in order to achieve high-performance. A batch, or chunk, can be an ordered list of one or more elements of streaming data. Without batching, the overhead of communication (calling the Next method) may become significant, especially for complex queries whose interpreters contain a large number of nodes and process a large amount of streaming data elements. Batching allows the overhead of function invocation to be amortized over multiple streaming data elements.

The policy is that the maximum batch size for streaming data is specified at the granularity of an individual query, such as an interpreter instance. The batch size may be a function of the data set size, or the number of results that the query is expected to produce, or some other parameter. The minimum batch size is always 1 data element. This property of batching by the interpreter is that every iterator in the interpreter instance must respect the original maximum batch size. Therefore, no iterator is allowed to return a batch of streaming data elements that is larger than the maximum batch size. This maximum batch size rule allows very efficient code to be written to handle common cases and simplifies memory management, thereby making reuse of buffers easy.

Stream data buffers are allocated when a parent iterator calls the NewChunk method on a child iterator. A child iterator is responsible for allocating the buffer since the child iterator will later also be responsible for filling the buffer with streaming data. A parent iterator uses it's knowledge about how buffers are used to determine how many buffers to create.

The memory allocation strategy of the interpreter is uniquely flexible. A parent iterator controls the lifecycle, scope, and reuse of the buffer from its perspective, such that a parent iterator decides when a buffer is ready to be reused. A child iterator decides whether or not to actually reuse the buffer that a parent iterator provides, and is always allowed to override a decision made by a parent iterator.

From a performance perspective, only the Next method is significant because the other iterator methods are called either once or a small number of times for any particular query. Note that there is no hasNext method for determining when the end of a data stream is reached. A hasNext method would add communication overhead. Instead, a child iterator returns an empty batch/chunk when there is no more data. An alternative Iterator API that does not support batching and uses some form of hasNext would require 2n method calls to process n streaming data elements, one call to determine if a streaming data element is available, and another call to retrieve the streaming data element, whereas the unique property of the iterator's API described here is that it uses n/maxBatchSize+1 function calls, which is typically 1-3 orders of magnitude less.

The individual parts of a streaming data element are represented by pointers which can very efficiently be copied from an input data element to an output data element when needed. Copying is often avoided by operating on streaming data elements in place. In place operations are safe because a parent iterator does not allow reuse until it has finished with the stream data buffer.

Figure 1:
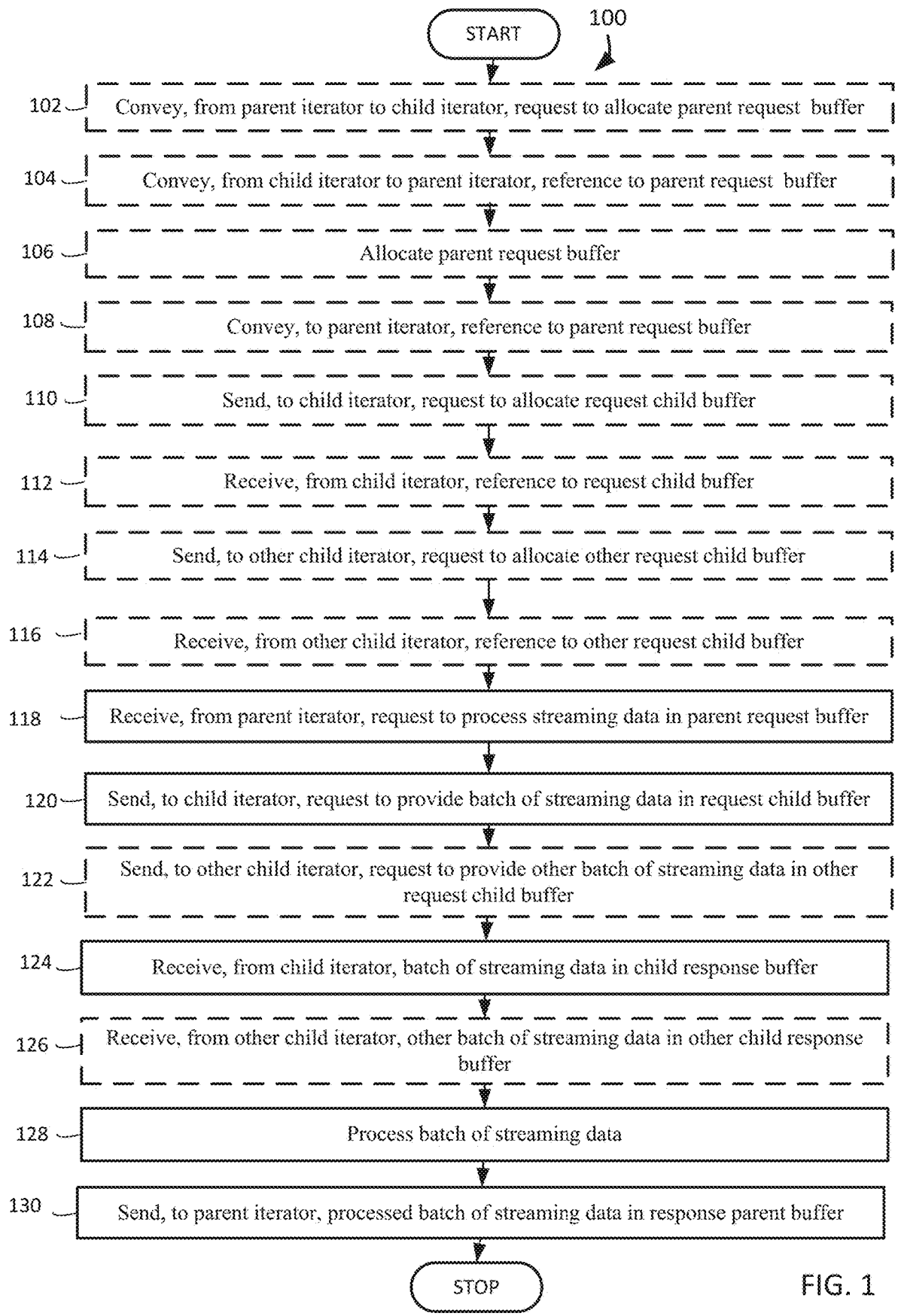
FIG. 1 depicts an operational flow diagram illustrating a high-level overview of a method for high-performance data streaming, in an embodiment.

FIG. 1 depicts an operational flow diagram illustrating a high-level overview of a method 100 for high-performance data streaming. The method 100 may be implemented on either a centralized computing platform or in parallel on a distributed computing platform. The method 100 is executed after any of the specific types of iterators is initialized by its parent iterator, and then initializes any number of its child iterator, as required for the specific type of iterator.

A request to allocate a parent request buffer is optionally conveyed from a parent iterator to a child iterator, block 102. A type 1 iterator passes its parent iterator's requests to allocate a buffer to its child iterator. For example, and without limitation, this can include the DimValueRows iterator conveying its parent iterator's request to allocate a buffer to its child iterator, instead of the DimValueRows iterator allocating the buffer itself. A parent iterator can be source of a derived object that enables the traversal of a stream of data elements. A child iterator can be a derived object that enables the traversal of a stream of data elements. A request can be a computer instruction to provide information or perform a function. A parent request buffer can be a temporary memory area in which data to be provided to a source object is stored while the data is being processed or transferred.

A reference to a parent request buffer is optionally conveyed from a child iterator to a parent iterator, block 104. A type 1 iterator returns a reference to an allocated buffer from its child iterator to its parent iterator. By way of example and without limitation, this can include the DimValueRows iterator passing a pointer to the buffer C1 from its child iterator to its parent iterator. A reference can be a variable whose value is the address of a buffer or a link to a buffer.

A parent request buffer is optionally allocated, block 106. Type 2, 3, 4, 5, and 6 iterators allocate buffers used by their parent iterators, instead of requesting their children iterators to allocate the buffers used by their parent iterators. In embodiments, this can include the MapGroupsInv iterator, the Cache iterator, the CrossIsectLeft iterator, an iterator being parallelized, or a Measure iterator allocating the buffer C1 for its parent iterator, instead of the specific type of iterator requesting any child iterator to allocate the buffer C1.

A reference to a parent request buffer is optionally conveyed to a parent iterator, block 108. Type 2, 3, 4, 5, and 6 iterators pass references to allocated buffers to their parent iterators. For example, and without limitation, this can include the MapGroupsInv iterator, the Cache iterator, the CrossIsectLeft iterator, an iterator being parallelized, or a Measure iterator passing a pointer to the buffer C1 that the specific type of iterator allocated to its parent iterator.

A request to allocate a request child buffer is optionally sent to a child iterator, block 110. Type 2, 3, 4, and 5 iterators request their child iterators to allocate buffers that differ from the buffers allocated for their parent iterators. By way of example and without limitation, this can include the MapGroupsInv iterator, the Cache iterator, or an iterator being parallelized initiating and sending a request to allocate a buffer to its child iterator. In another example, the CrossIsectLeft iterator initiates and sends a request to allocate a first buffer to its first child iterator. A request child buffer can be a temporary memory area in which data to be provided by a derived object is stored while the data is being processed or transferred.

A reference to a request child buffer is optionally received from a child iterator, block 112. Type 2, 3, 4, and 5 iterators receive references to allocated buffers from their child iterators. In embodiments, this can include the MapGroupsInv iterator, the Cache iterator, or an iterator being parallelized receiving a pointer to the buffer C2 from its child iterator, which differs from the buffer C1 that the specific type of iterator allocated for its parent iterator. In another example, the CrossIsectLeft iterator receives a pointer to the buffer C2 from its first child iterator, which differs from the buffer C1 that the CrossIsectLeft iterator allocated for its parent iterator.

A request to allocate another request child buffer is optionally sent to another child iterator, block 114. A type 4 iterator requests the second of its children iterators to allocate a second buffer that differs from the buffer allocated for its parent iterator. For example, and without limitation, this can include the CrossIsectLeft iterator initiating and sending a request to allocate a second buffer to its second child iterator.

A reference to another request child buffer is optionally received from another child iterator, block 116. A type 4 iterator receives a reference to a second allocated buffer from the second of its children iterators. By way of example and without limitation, this can include the CrossIsectLeft iterator receiving a pointer to the buffer C3 from its second child iterator, which differs from the buffer C1 that the CrossIsectLeft iterator allocated for its parent iterator, and also differs from the buffer C2 that the first child iterator allocated.

A request to process streaming data in a parent request buffer is received from a parent iterator, block 118. Type 1, 2, 3, 4, 5, and 6 iterators receive requests from their parent iterators to process streaming data in their parent iterators' buffers. In embodiments, this can include the DimValueRows iterator, the MapGroupsInv iterator, the Cache iterator, the CrossIsectLeft iterator, an iterator being parallelized, or the Measure iterator receiving a request from its parent iterator to process streaming data elements in the parent iterator's buffer C1. Streaming data can be a sequence of digitally encoded coherent signals used to transmit or receive information that is in the process of being transmitted.

A request to provide a batch of streaming data in a request child buffer is sent to a child iterator, block 120. Type 1, 2, 3, 4, and 5 iterators send requests from their parent iterators to their child iterators to provide streaming data in buffers. For example, and without limitation, this can include the DimValueRows iterator requests its child iterator to provide streaming data in its parent iterator's buffer C1. In another example, the MapGroupsInv iterator, the Cache iterator, or an iterator being parallelized requests its child iterator to provide streaming data in the child iterator's buffer C2, which differs from the buffer C1 that the specific type of iterator allocated for its parent iterator. In yet another example, the CrossIsectLeft iterator requests its first child iterator to provide streaming data in the first child iterator's buffer C2, which differs from the buffer C1 that the CrossIsectLeft iterator allocated for its parent iterator. A batch can be a group of data elements processed as a single unit.

A request to provide another batch of streaming data in another request child buffer is optionally sent to another child iterator, block 122. A type 4 iterator sends a request from its parent iterator to the second of its child iterators to provide streaming data in another buffer. By way of example and without limitation, this can include the CrossIsectLeft iterator requesting the second of its child iterators to provide streaming data in the second child iterator's buffer C3, which differs from the buffer C1 that the CrossIsectLeft iterator allocated for its parent iterator, and also differs from the buffer C2 that the first child iterator allocated.

A batch of streaming data in a child response buffer is received from a child iterator, block 124. Type 1, 2, 3, 4, and 5 iterators receive batches of streaming data from their child iterators in buffers. In embodiments, this can include the DimValueRows iterator receiving a batch streaming data from its child iterator in its parent iterator's buffer C1. In another example, the MapGroupsInv iterator or an iterator being parallelized receives a batch of streaming data from its child iterator in the child iterator's buffer C2, which differs from the buffer C1 that the specific type of iterator allocated for its parent iterator. In yet another example, the Cache iterator receives a batch of streaming data from its child iterator in the child iterator's buffer C4, and not in the buffer C2 that the child iterator previously allocated for the Cache iterator or in the buffer C1 that the Cache iterator allocated for its parent iterator. In an additional example, the CrossIsectLeft iterator receives a first batch of streaming data from its first child iterator in the first child iterator's buffer C2, which differs from the buffer C1 that the CrossIsectLeft iterator allocated for its parent iterator. A child response buffer can be a temporary memory area in which data provided by a derived object is stored while the data is being processed or transferred.

Another batch of streaming data in another child response buffer is optionally received from another child iterator, block 126. A type 4 iterator receives a batch of streaming data from the second of its child iterators in the second child iterator's buffer. For example, and without limitation, this can include the CrossIsectLeft iterator, receiving a second batch of streaming data from its second child iterator in the second child iterator's buffer C3, which differs from the buffer C1 that the CrossIsectLeft iterator allocated for its parent iterator, and also differs from the buffer C2 that the first child iterator allocated.

A batch of streaming data is processed, block 128. Type 1, 2, 3, 4, 5, and 6 iterators process batches of streaming data for their parent iterators. By way of example and without limitation, this can include the DimValueRows iterator or the Measure iterator processing a batch of streaming data elements in the buffer C1 for its parent iterator. In another example, the MapGroupsInv iterator or an iterator being parallelized processes a batch of streaming data elements in the buffer C2, which differs from the buffer C1 that the specific type of iterator allocated for its parent iterator. In yet another example, the Cache iterator processes a batch of streaming data elements in the buffer C4, which differs from the buffer C1 that the Cache iterator allocated for its parent iterator, and also differs from the buffer C2 that the child iterator previously allocated for the Cache iterator. In an additional example, the CrossIsectLeft iterator processes the first batch of streaming data elements in the buffer C2, and the second batch of streaming data elements in the buffer C3, each of which differ from the buffer C1 that the CrossIsectLeft iterator allocated for its parent iterator. Processing can be taking an action in order to achieve a particular end. A combination can be a joining or merging of different parts or qualities in which the component elements are individually distinct.

A processed batch of streaming data in a response parent buffer is sent to a parent iterator, block 130. Type 1, 2, 3, 4, 5, and 6 iterators send processed batches of streaming data in buffers to their parent iterators. In embodiments, this can include the DimValueRows iterator, the MapGroupsInv iterator, the Cache iterator, the CrossIsectLeft iterator, or the Measure iterator sending a processed batch of streaming data elements in its parent iterator's buffer C1 to its parent iterator. In another example, an iterator being parallelized sends a processed batch of streaming data elements in a pooled buffer C5, and not in the parent iterator's buffer C1, to its parent iterator. A processed batch can be a group of data elements upon which an action is taken. A response parent buffer can be a temporary memory area in which data provided for a source object is stored while the data is being processed or transferred.

The method 100 may be repeated as desired. Although this disclosure describes the blocks 102-130 executing in a particular order, the blocks 102-130 may be executed in a different order. In other implementations, each of the blocks 102-130 may also be executed in combination with other blocks and/or some blocks may be divided into a different set of blocks.

Figure 2:
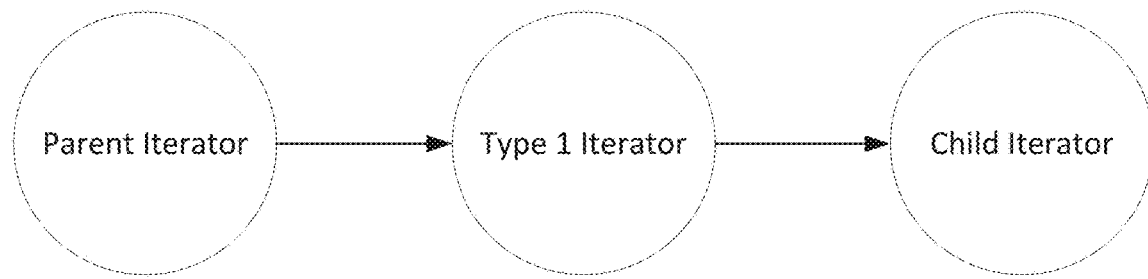
FIGS. 2-8 depict example iterators for high-performance data streaming, in an embodiment.
Figure 2:
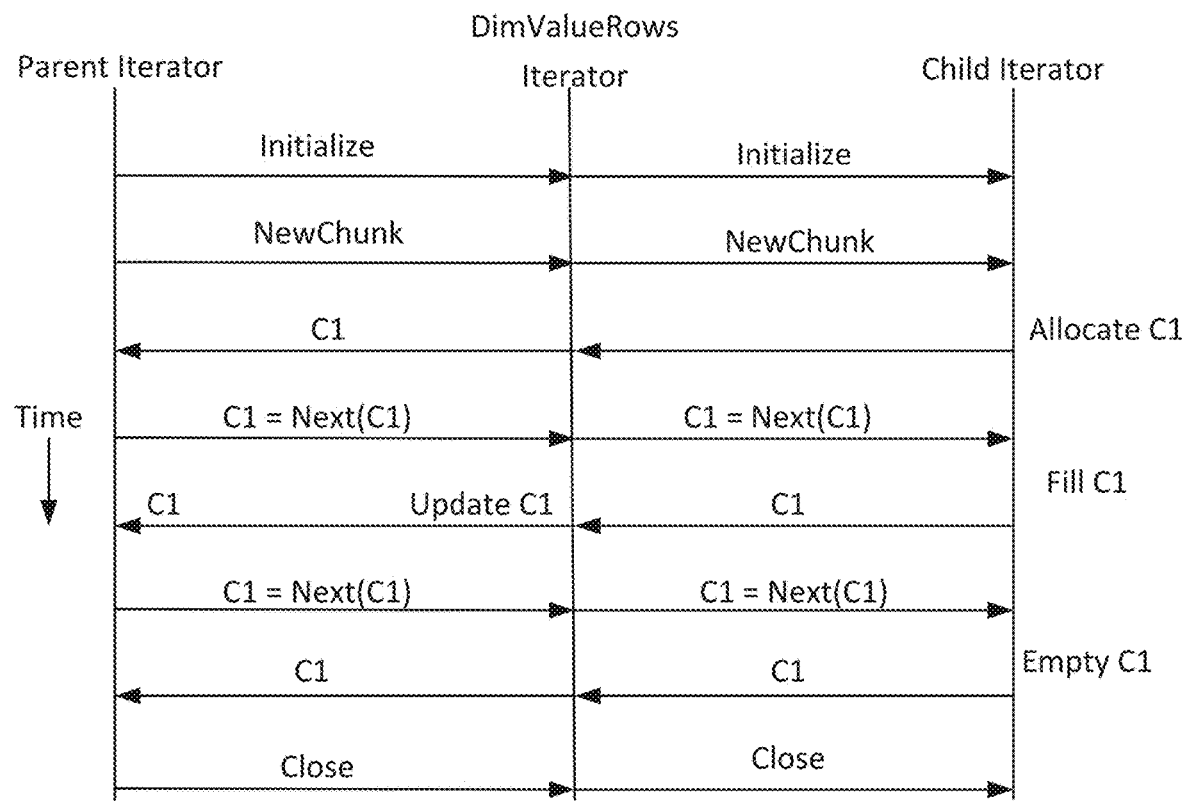
Figure 2:
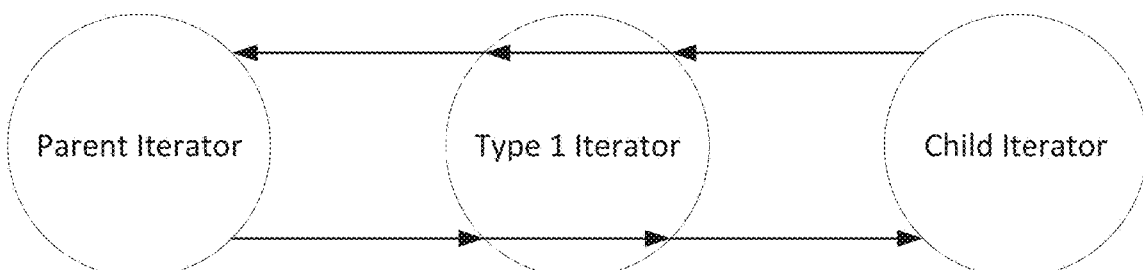

FIG. 2A depicts example iterators that include a type 1 iterator, in an embodiment. A type 1 iterator has a single child, and the output shape and input shape are the same. Type 1 iterators include the DimValueRows iterator and the RowRange iterator. Type 1 iterators may be considered "pass-through" iterators from a memory allocation and reuse perspective, because they typically modify-in-place or filter streaming data elements.

FIG. 2B depicts an example timeline of interactions between iterators that include a type 1 iterator, in an embodiment. In this example, the DimValueRows iterator updates grouping key values in each streaming data element, converting from their internal (numeric) to external (string) value/representation. There is a direct 1-to-1 correspondence between input and output data elements. Furthermore, only the grouping key values change between the corresponding input and output data elements, thereby making in-place updates faster than copying.

The usual Initialize and Close methods begin and end the sequence. In this example, only a single stream data buffer, C1, is allocated by the DimValueRows iterator, when its parent iterator calls the NewChunk method. The parent iterator's NewChunk invocation is delegated by the DimValueRows iterator to the child iterator which actually performs the allocation of the buffer C1. The buffer C1 is then reused repeatedly by the parent iterator. The buffer C1 is passed from the parent iterator to the DimValueRows iterator and by the DimValueRows iterator to the child iterator, where the buffer C1 is filled with data. The buffer C1 is then returned by the child iterator, and the elements that it contains are updated by the DimValueRows iterator, and then returned to the parent iterator. This cycle then repeats until the child iterator returns an empty buffer C1, which is returned unchanged by the DimValueRows iterator to the parent iterator. The DimValueRows iterator performs no allocation or copying itself, so it's allocation behavior is optimal.

The (somewhat simplified) code snippet below illustrates the internals of the Next method of the DimValueRows iterator. The loop control logic is extremely efficient and simple because the DimValueRows iterator, its child iterator, and its parent iterator all agree to return the same maximum number of elements from the Next method.

```
outChunk, err =dvm.Child.Next(outChunk)
currentOut := 0
for ; currentOut < outChunk.Used; currentOut++ {
  // update element outChunk.Data[currentOut]
}
return outChunk
```

If the child iterator returns fewer streaming data elements than the maximum allowed in the example above, then the DimValueRows iterator will also return that same number of streaming data elements. The DimValueRows iterator does not make any attempt to combine multiple batches of data from a child iterator into a single output batch. This lack of combining multiple batches is allowed because iterators typically do return a full batch, so combining batches is not worth the extra complexity and overhead. More complex iterators, such as grouping iterators, which may produce partial batches in response to a full batch, do contain such combining logic. If the parent Aerator chooses, a single buffer may be used by a type 1 iterator to handle any number of streaming data elements.

Figure 3:
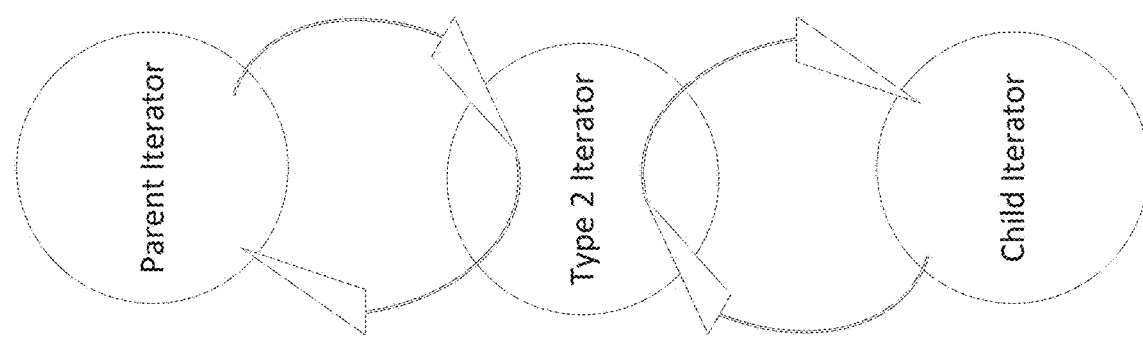

FIG. 3 depicts example iterators that include a type 2 iterator, in an embodiment. A type 2 iterator has a single child, and the output shape and input shape are different. Type 2 iterators include the CrossIsectDimIndex (XIDI) iterator and the MapGroupsInv (MGI) iterator. Type 2 iterators call child.NewChunk to create a single StreamData buffer which is reused for each call to child.Next( ). Internally, the type 2 Aerator manages some state about how many elements it has consumed in the StreamData buffer that it passes to its child iterator. Elements returned by the child iterator are processed internally and the results are returned by a type 2 iterator to the parent iterator using the StreamData buffer managed by the parent iterator. Thus, an optimal number of buffers (1) are allocated and used by a type 2 iterator and all buffers passed by its parent iterator are reused, which is also optimal.

Figure 4:
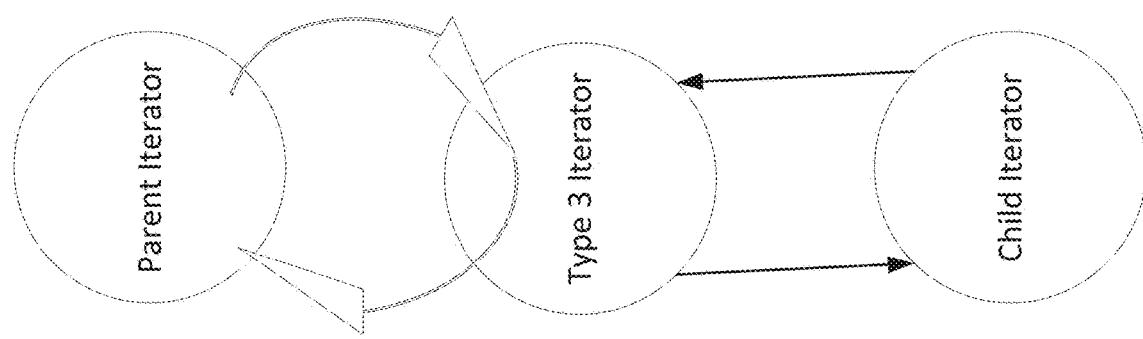

FIG. 4 depicts example iterators that include a type 3 iterator, in an embodiment. A type 3 iterator has a single child, and the output shape and input shape are the same, with no StreamData recycling. Type 3 iterators include the SortRows iterator and the Cache iterator. Type 3 iterators use the StreamData buffer passed by their client/parent to return data. When calling child.Next( ) they always pass a new StreamData buffer which they obtained by calling child.NewChunk( ). In the case of SortRows, this flow is used to read all of the data from the child iterator and sort it before returning any data to the client/parent. Thus, there is a potentially large amount of internal state maintained by the type 3 iterator. However, the number of buffers used is optimal since reuse is not possible for buffers returned by the child iterator. In addition, the maximum amount of reuse is enabled for the buffer passed to the iterator by its client/parent, as all buffers are reused and returned. Again, there is no reuse for buffers passed to the child iterator, but this is a requirement for this type of iterator.

Figure 5:
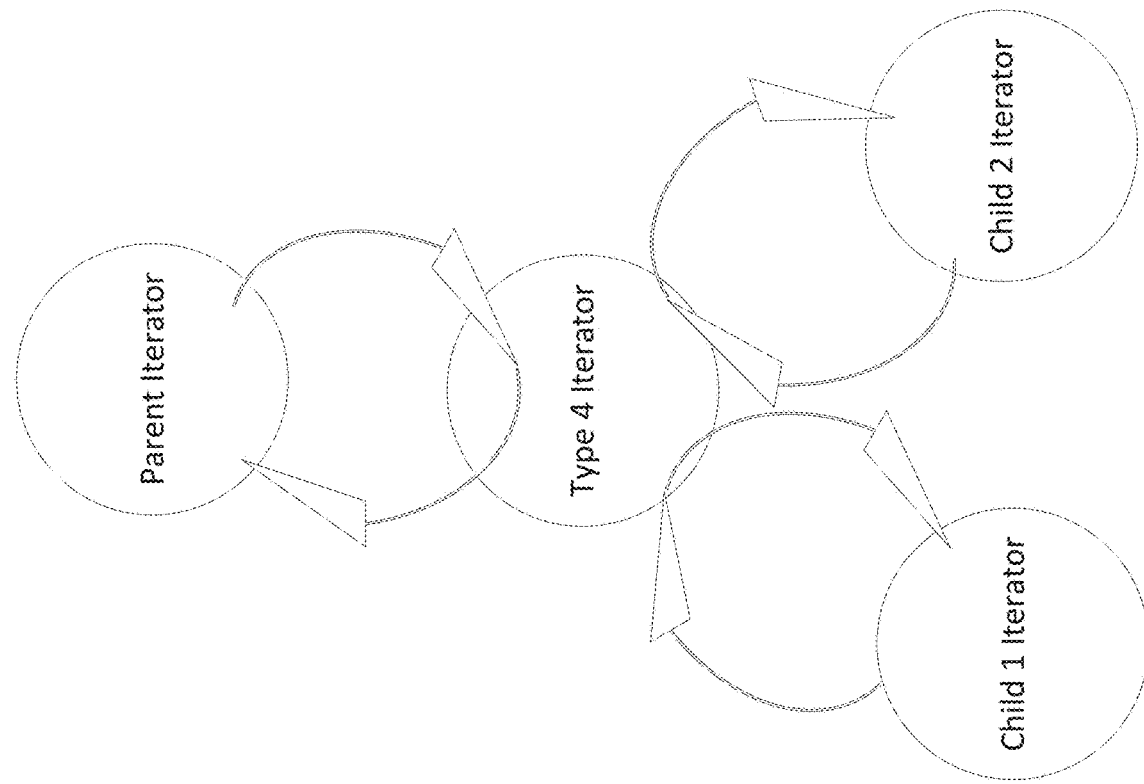

FIG. 5 depicts example iterators that include a type 4 iterator, in an embodiment. A type 4 iterator has two children, and the output shape and input shapes are different. CrossIsectLeft (XIL) is a type 4 iterator. Type 4 iterators recycle the StreamData buffers for its children iterators and use the StreamData buffer passed by its parent iterator to return results. Type 4 iterators may manage a significant amount of internal state which decouples the input from the output. Note that the optimal number of buffers are used for each child iterator (1), and the maximum amount of reuse is enabled for the buffer managed by the parent iterator.

Figure 6:
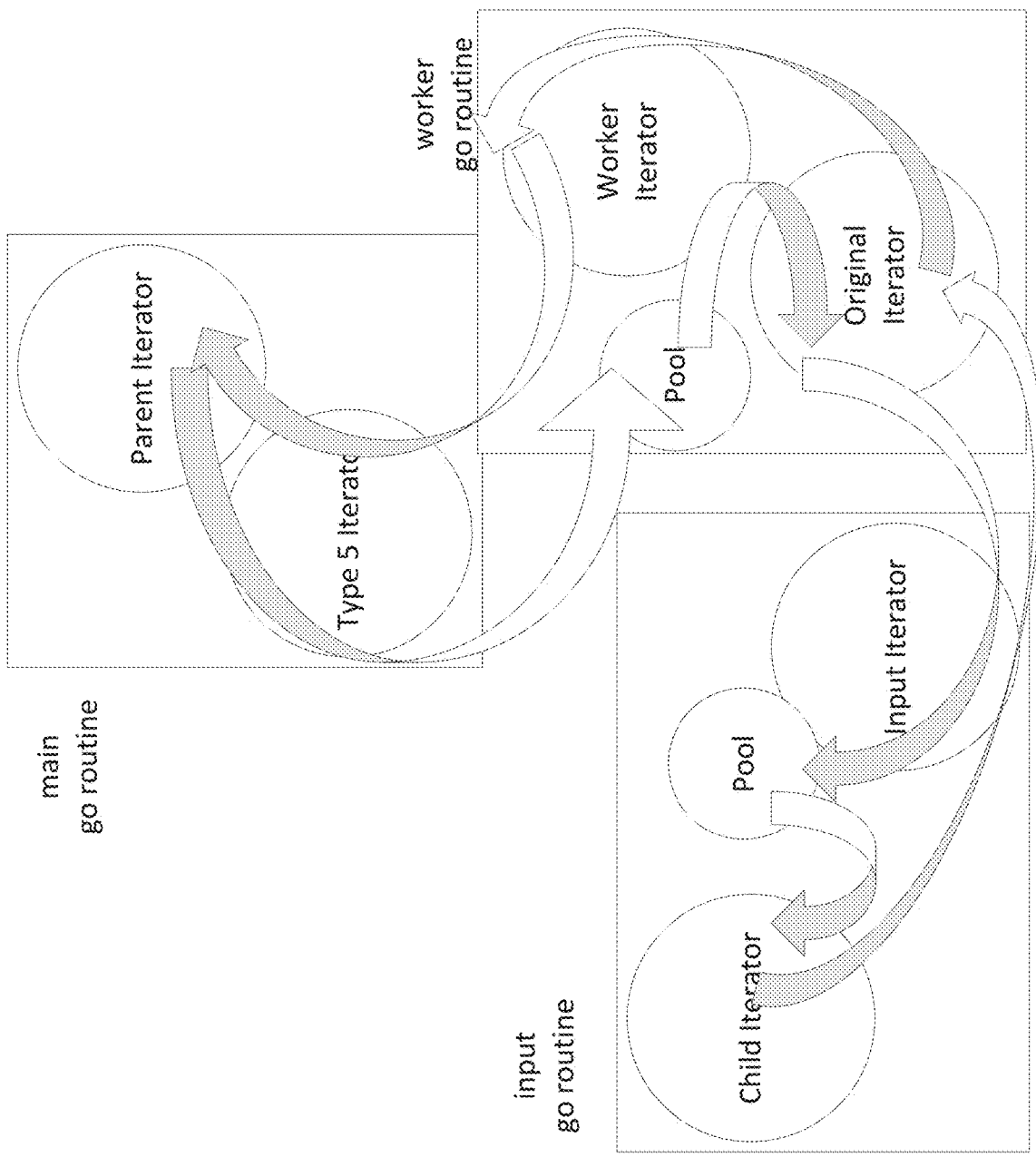

FIG. 6 depicts example iterators that include a type 5 iterator, in an embodiment. A type 5 iterator includes specialized iterator frameworks that utilize pooling of StreamData chunks. The asynchronous iterators AsyncWorkers and OrderedAsyncWorkers are type 5 iterators. The parent iterator, the original iterator being parallelized, and the child iterator before asynchronous operation was added represent "regular" iterators in the system. The type 5 iterator simply passes StreamData elements through, as it is a router for streaming data that internally utilizes pooling to provide optimal reuse of streaming data chunks. Memory allocation and reuse is optimal since StreamData chunks received from the parent iterator are always put back in the pool for reuse. These same chunks are later returned to the parent iterator once they have been filled with data by the original iterator. The original iterator runs in a separate goroutine and receives chunks from the worker iterator, which is an internal component of the asynchronous framework.

Figure 7:
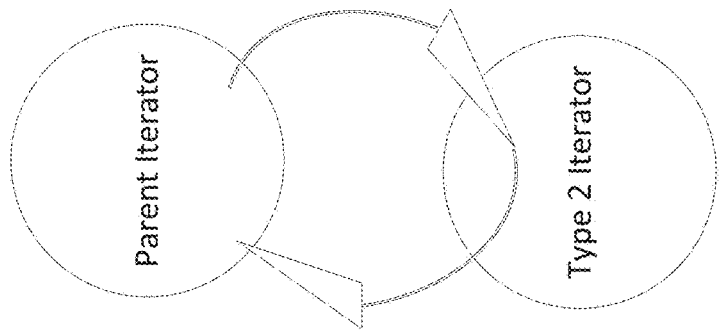

FIG. 7 depicts example iterators that include a type 6 iterator, in an embodiment. The type 6 iterator has no children. Type 6 iterators include the DimData iterator and the Measure iterator. Type 6 iterators receive a StreamData buffer from their parent iterator and fill the StreamData buffer with data. The parent iterator is responsible for reuse, hence the amount of reuse for a Type 6 iterator is optimal—no unnecessary StreamData buffers are created and all StreamData buffers received are reused.

Figure 8:
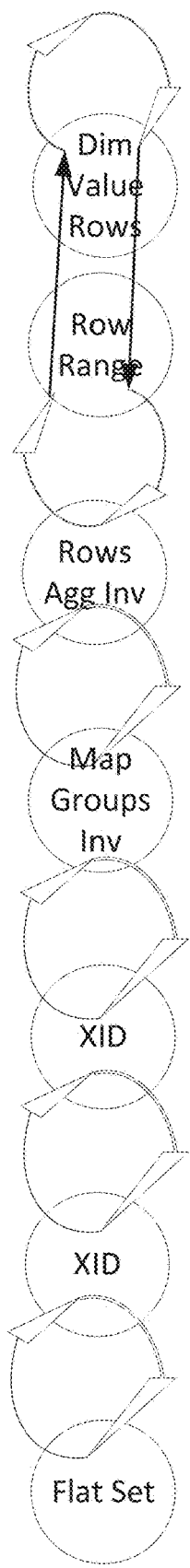

FIG. 8 depicts example iterators for high performance data streaming, in an embodiment. FIG. 8 shows the flow and reuse of StreamData buffers for the following query. Each cycle in the figure represents a StreamData buffer which is reused. Consequently, this query uses five buffers to process the streaming data. In other words, the number of buffers is small and very bounded (constant size) while the streaming data being processed is essentially unbounded.
q=load\"data/edgemarts/Opportunity/OpportunityEM\";

q=filter q by StageName in [\"5-Closed-Lost\", \"5-Closed-Won\"];
q=group q by ('Region', 'Outcome');
q=foreach q generate 'Region' as 'd1Region', 'Outcome' as 'd2Outcome', count( ) as 'm1Count', sum('Amount') as 'm2SumAmount', max('Amount') as 'm3MaxAmount';
q=limit q 100;

System Overview

Figure 9:
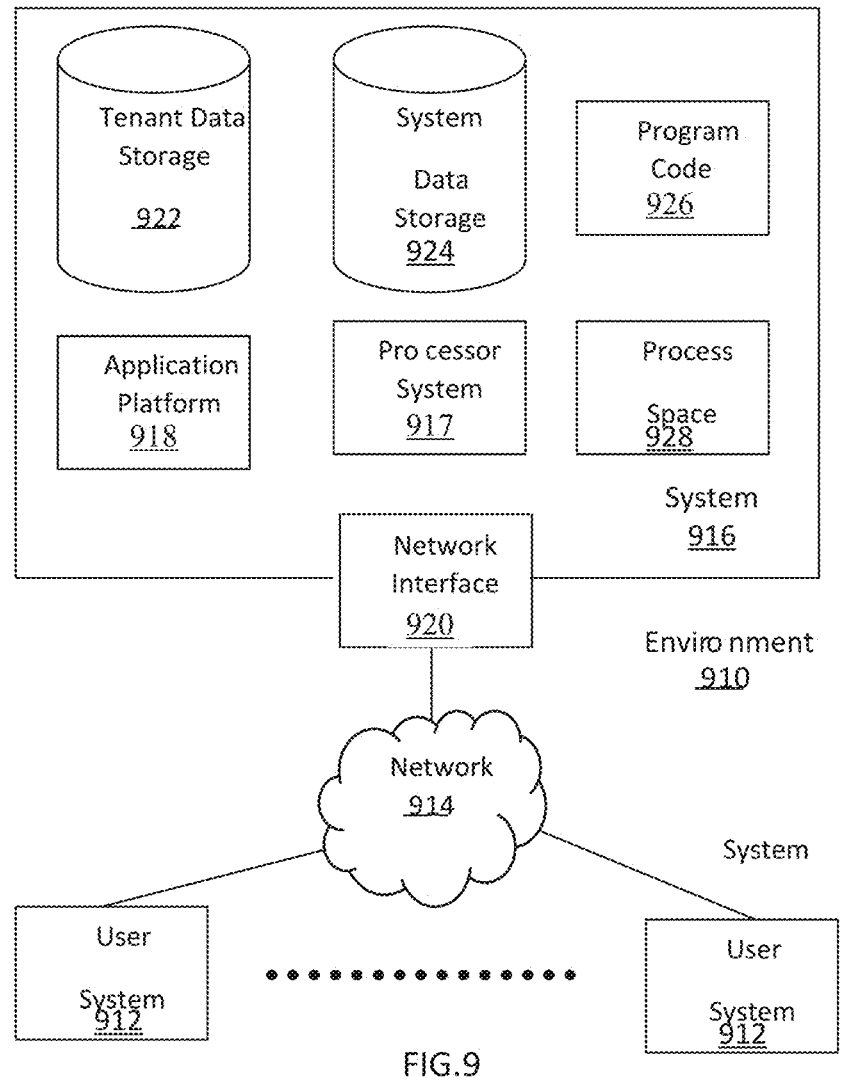
FIG. 9 illustrates a block diagram of an example of an environment wherein an on-demand database service might be used.

FIG. 9 illustrates a block diagram of an environment 910 wherein an on-demand database service might be used. The environment 910 may include user systems 912, a network 914, a system 916, a processor system 917, an application platform 918, a network interface 920, a tenant data storage 922, a system data storage 924, program code 926, and a process space 928. In other embodiments, the environment 910 may not have all of the components listed and/or may have other elements instead of, or in addition to, those listed above.

The environment 910 is an environment in which an on-demand database service exists. A user system 912 may be any machine or system that is used by a user to access a database user system. For example, any of the user systems 912 may be a handheld computing device, a mobile phone, a laptop computer, a work station, and/or a network of computing devices. As illustrated in FIG. 9 (and in more detail in FIG. 10) the user systems 912 might interact via the network 914 with an on-demand database service, which is the system 916.

An on-demand database service, such as the system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 916" and the "system 916" will be used interchangeably herein. A database image may include one or more database objects. A relational database management system (RDMS) or the equivalent may execute storage and retrieval of information against the database object(s). The application platform 918 may be a framework that allows the applications of the system 916 to run, such as the hardware and/or software, e.g., the operating system. In an embodiment, the on-demand database service 916 may include the application platform 918 which enables creation, managing and executing one or more applications developed by the provider of the on-demand database service, users accessing the on-demand database service via user systems 912, or third-party application developers accessing the on-demand database service via the user systems 912.

The users of the user systems 912 may differ in their respective capacities, and the capacity of a particular user system 912 might be entirely determined by permissions (permission levels) for the current user. For example, where a salesperson is using a particular user system 912 to interact with the system 916, that user system 912 has the capacities allotted to that salesperson. However, while an administrator is using that user system 912 to interact with the system 916, that user system 912 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 914 is any network or combination of networks of devices that communicate with one another. For example, the network 914 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 912 might communicate with the system 916 using TCP/IP and, at a higher network level, use other common Internet protocols to communicate, such as HTTP, FTP, AFS, WAP, etc. In an example where HTTP is used, the user systems 912 might include an HTTP client commonly referred to as a "browser" for sending and receiving HTTP messages to and from an HTTP server at the system 916. Such an HTTP server might be implemented as the sole network interface between the system 916 and the network 914, but other techniques might be used as well or instead. In some implementations, the interface between the system 916 and the network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 916, shown in FIG. 9, implements a web-based customer relationship management (CRM) system. For example, in one embodiment, the system 916 includes application servers configured to implement and execute CRM software applications as well as provide related data, code, forms, webpages and other information to and from the user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 916 implements applications other than, or in addition to, a CRM application. For example, the system 916 may provide tenant access to multiple hosted (standard and custom) applications, including a CRM application. User (or third-party developer) applications, which may or may not include CRM, may be supported by the application platform 918, which manages creation, storage of the applications into one or more database objects and executing of the applications in a virtual machine in the process space of the system 916.

One arrangement for elements of the system 916 is shown in FIG. 9, including the network interface 920, the application platform 918, the tenant data storage 922 for tenant data 923, the system data storage 924 for system data 925 accessible to the system 916 and possibly multiple tenants, the program code 926 for implementing various functions of the system 916, and the process space 928 for executing MTS system processes and tenant-specific processes, such as running applications as part of an application hosting service. Additional processes that may execute on the system 916 include database indexing processes.

Several elements in the system shown in FIG. 9 include conventional, well-known elements that are explained only briefly here. For example, each of the user systems 912 could include a desktop personal computer, workstation, laptop, PDA, cell phone, or any wireless access protocol (WAP) enabled device or any other computing device capable of interfacing directly or indirectly to the Internet or other network connection. Each of the user systems 912 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 912 to access, process and view information, pages and applications available to it from the system 916 over the network 914. Each of the user systems 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 916 or other systems or servers. For example, the user interface device may be used to access data and applications hosted by the system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 912 and all of its components are operator configurable using applications, such as a browser, including computer code run using a central processing unit such as an Intel Pentium® processor or the like. Similarly, the system 916 (and additional instances of an MTS, where more than one is present) and all of their components might be operator configurable using application(s) including computer code to run using a central processing unit such as the processor system 917, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 916 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 916 is configured to provide webpages, forms, applications, data and media content to the user (client) systems 912 to support the access by the user systems 912 as tenants of the system 916. As such, the system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 10:
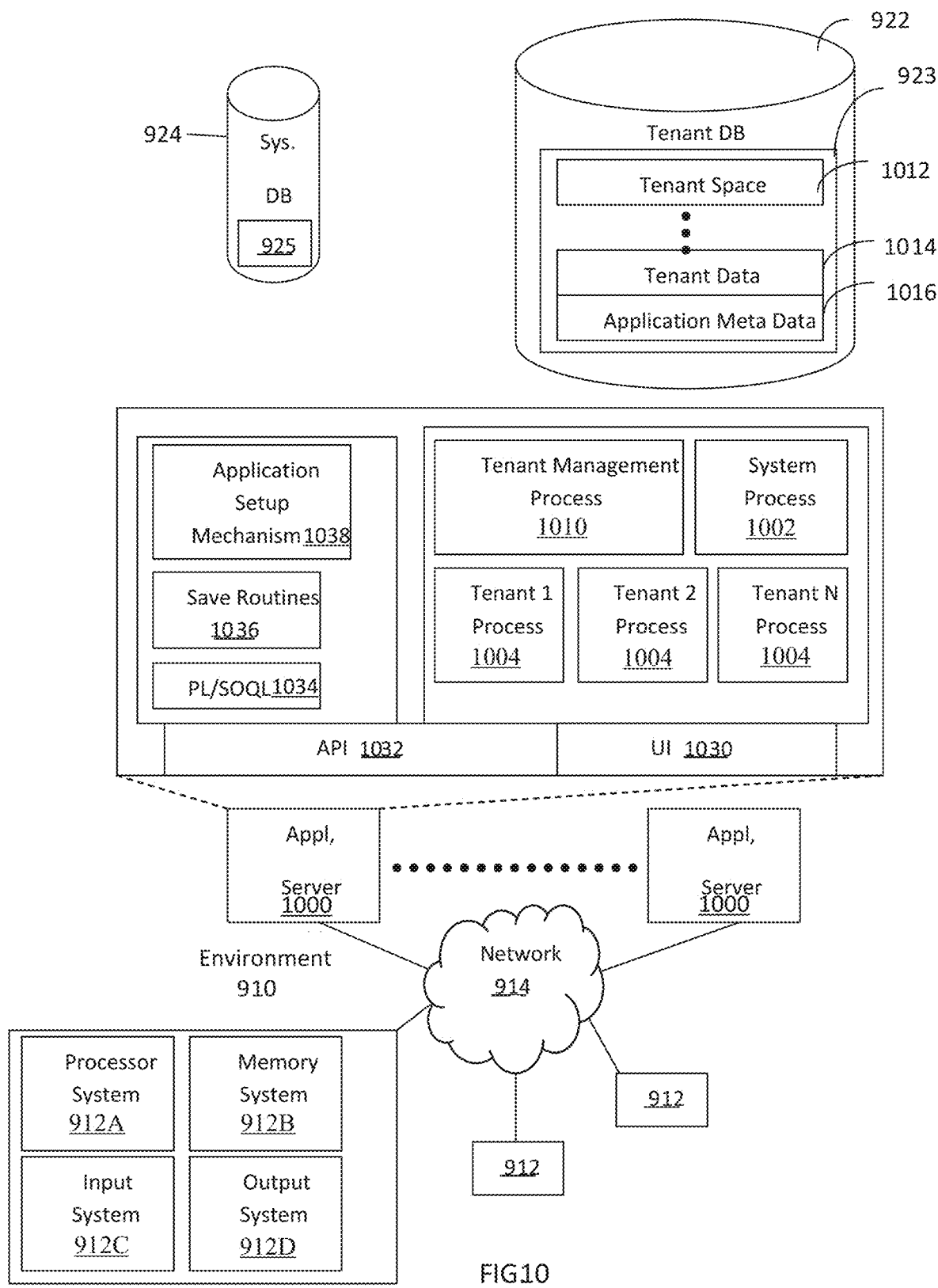
FIG. 10 illustrates a block diagram of an embodiment of elements of FIG. 9 and various possible interconnections between these elements.

FIG. 10 also illustrates the environment 910. However, in FIG. 10 elements of the system 916 and various interconnections in an embodiment are further illustrated. FIG. 10 shows that the each of the user systems 912 may include a processor system 912A, a memory system 912B, an input system 912C, and an output system 912D. FIG. 10 shows the network 914 and the system 916. FIG. 10 also shows that the system 916 may include the tenant data storage 922, the tenant data 923, the system data storage 924, the system data 925, a User Interface (UI) 1030, an Application Program Interface (API) 1032, a PL/SOQL 1034, save routines 1036, an application setup mechanism 1038, applications servers 1000$_1$-1000$_N$, a system process space 1002, tenant process spaces 1004, a tenant management process space 1010, a tenant storage area 1012, a user storage 1014, and application metadata 1016. In other embodiments, the environment 910 may not have the same elements as those listed above and/or may have other elements instead of, or in addition to, those listed above.

The user systems 912, the network 914, the system 916, the tenant data storage 922, and the system data storage 924 were discussed above in FIG. 9. Regarding the user systems 912, the processor system 912A may be any combination of one or more processors. The memory system 912B may be any combination of one or more memory devices, short term, and/or long-term memory. The input system 912C may be any combination of input devices, such as one or more keyboards, mice, trackballs, scanners, cameras, and/or interfaces to networks. The output system 912D may be any combination of output devices, such as one or more monitors, printers, and/or interfaces to networks. As shown by FIG. 10, the system 916 may include the network interface 920 (of FIG. 9) implemented as a set of HTTP application servers 1000, the application platform 918, the tenant data storage 922, and the system data storage 924. Also shown is the system process space 1002, including individual tenant process spaces 1004 and the tenant management process space 1010. Each application server 1000 may be configured to access tenant data storage 922 and the tenant data 923 therein, and the system data storage 924 and the system data 925 therein to serve requests of the user systems 912. The tenant data 923 might be divided into individual tenant storage areas 1012, which may be either a physical arrangement and/or a logical arrangement of data. Within each tenant storage area 1012, the user storage 1014 and the application metadata 1016 might be similarly allocated for each user. For example, a copy of a user's most recently used (MRU) items might be stored to the user storage 1014. Similarly, a copy of MRU items for an entire organization that is a tenant might be stored to the tenant storage area 1012. The UI 1030 provides a user interface and the API 1032 provides an application programmer interface to the system 916 resident processes to users and/or developers at the user systems 912. The tenant data and the system data may be stored in various databases, such as one or more Oracle™ databases.

The application platform 918 includes the application setup mechanism 1038 that supports application developers' creation and management of applications, which may be saved as metadata into the tenant data storage 922 by the save routines 1036 for execution by subscribers as one or more tenant process spaces 1004 managed by the tenant management process 1010 for example. Invocations to such applications may be coded using the PL/SOQL 1034 that provides a programming language style interface extension to the API 1032. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 1016 for the subscriber making the invocation and executing the metadata as an application in a virtual machine.

Each application server 1000 may be communicably coupled to database systems, e.g., having access to the system data 925 and the tenant data 923, via a different network connection. For example, one application server $1000_1$ might be coupled via the network 914 (e.g., the Internet), another application server $1000_{N-1}$ might be coupled via a direct network link, and another application server $1000_N$ might be coupled by yet a different network connection. Transfer Control Protocol and Internet Protocol (TCP/IP) are typical protocols for communicating between application servers 1000 and the database system. However, it will be apparent to one skilled in the art that other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In one embodiment, therefore, an interface system implementing a load balancing function (e.g., an F5 Big-IP load balancer) is communicably coupled between the application servers 1000 and the user systems 912 to distribute requests to the application servers 1000. In one embodiment, the load balancer uses a least connections algorithm to route user requests to the application servers 1000. Other examples of load balancing algorithms, such as round robin and observed response time, also may be used. For example, in certain embodiments, three consecutive requests from the same user could hit three different application servers 1000, and three requests from different users could hit the same application server 1000. In this manner, the system 916 is multi-tenant, wherein the system 916 handles storage of, and access to, different objects, data and applications across disparate users and organizations.

As an example of storage, one tenant might be a company that employs a sales force where each salesperson uses the system 916 to manage their sales process. Thus, a user might maintain contact data, leads data, customer follow-up data, performance data, goals and progress data, etc., all applicable to that user's personal sales process (e.g., in the tenant data storage 922). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 916 might also maintain system level data usable by multiple tenants or other data. Such system level data might include industry reports, news, postings, and the like that are sharable among tenants.

In certain embodiments, the user systems 912 (which may be client systems) communicate with the application servers 1000 to request and update system-level and tenant-level data from the system 916 that may require sending one or more queries to the tenant data storage 922 and/or the system data storage 924. The system 916 (e.g., an application server 1000 in the system 916) automatically generates one or more SQL statements (e.g., one or more SQL queries) that are designed to access the desired information. The system data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system comprising:
one or more processors; and
a non-transitory computer readable medium storing a plurality of instructions, which when executed, cause the one or more processors to:
receive, from a parent iterator, a request to process streaming data in a parent request buffer;
cause a request to provide a batch of the streaming data in a request child buffer to be sent to a child iterator;
cause a request to provide another batch of the streaming data in another request child buffer to be sent to another child iterator;
receive, from the child iterator, the batch of the streaming data in a child response buffer;
receive, from the other child iterator, the other batch of the streaming data in another child response buffer;
process a combination of the batch of the streaming data and the other batch of the streaming data; and
cause a combination of the processed batch of the streaming data and the other processed batch of the streaming data stored in a response parent buffer to be sent to the parent iterator.

2. The system of claim 1, wherein the parent request buffer comprises the response parent buffer, and the parent request buffer is one of different from both the request child buffer and the child response buffer, and same as both the request child buffer and the child response buffer.

3. The system of claim 2, wherein the request child buffer is one of different from the child response buffer and same as the child response buffer.

4. The system of claim 1, comprising further instructions, which when executed, cause the one or more processors to:
convey, from the parent iterator to the child iterator, a request to allocate the parent request buffer; and
convey, from the child iterator to the parent iterator, a reference to the parent request buffer.

5. The system of claim 1, comprising further instructions, which when executed, cause the one or more processors to:
allocate the parent request buffer;
convey, to the parent iterator, a reference to the parent request buffer;
cause a request to allocate the request child buffer to be sent to the child iterator; and
receive, from the child iterator, a reference to the request child buffer.

6. The system of claim 1, comprising further instructions, which when executed, cause the one or more processors to:
cause a request to allocate the other request child buffer to be sent to the other child iterator; and
receive, from the other child iterator, a reference to the other request child buffer.

7. A computer program product comprising a non-transitory computer-readable medium having computer-readable program code embodied therein to be executed by one or more processors, the program code including instructions to:
receive, from a parent iterator, a request to process streaming data in a parent request buffer;
cause a request to provide a batch of the streaming data in a request child buffer to be sent to a child iterator;
cause a request to provide another batch of the streaming data in another request child buffer to be sent to another child iterator;
receive, from the child iterator, the batch of the streaming data in a child response buffer;
receive, from the other child iterator, the other batch of the streaming data in another child response buffer;
process a combination of the batch of the streaming data and the other batch of the streaming data; and
cause a combination of the processed batch of the streaming data and the other processed batch of the streaming data stored in a response parent buffer to be sent to the parent iterator.

8. The computer program product of claim 7, wherein the parent request buffer comprises the response parent buffer, and the parent request buffer is one of different from both the request child buffer and the child response buffer, and same as both the request child buffer and the child response buffer, and the request child buffer is one of different from the child response buffer and same as the child response buffer.

9. The computer program product of claim 7, wherein the program code comprises further instructions to:
convey, from the parent iterator to the child iterator, a request to allocate the parent request buffer; and convey, from the child iterator to the parent iterator, a reference to the parent request buffer.

10. The computer program product of claim 7, wherein the program code comprises further instructions to:
allocate the parent request buffer;
convey, to the parent iterator, a reference to the parent request buffer;
cause a request to allocate the request child buffer to be sent to the child iterator; and
receive, from the child iterator, a reference to the request child buffer.

11. The computer program product of claim 7, wherein the program code comprises further instructions to:
cause a request to allocate the other request child buffer to be sent to the other child iterator; and
receive, from the other child iterator, a reference to the other request child buffer.

12. A method comprising:
receiving, from a parent iterator, a request to process streaming data in a parent request buffer;
causing a request to provide a batch of the streaming data in a request child buffer to be sent to a child iterator;
causing a request to provide another batch of the streaming data in another request child buffer to be sent to another child iterator;
receiving, from the child iterator, the batch of the streaming data in a child response buffer;
receiving, from the other child iterator, the other batch of the streaming data in another child response buffer;
processing a combination of the batch of the streaming data and the other batch of the streaming data; and
causing a combination of the processed batch of the streaming data and the other processed batch of the streaming data stored in a response parent buffer to be sent to the parent iterator.

13. The method of claim 12, wherein the parent request buffer comprises the response parent buffer, and the parent request buffer is one of different from both the request child buffer and the child response buffer, and same as both the request child buffer and the child response buffer.

14. The method of claim 13, wherein the request child buffer is one of different from the child response buffer and same as the child response buffer.

15. The method of claim 12, the method further comprising:
conveying, from the parent iterator to the child iterator, a request to allocate the parent request buffer; and
conveying, from the child iterator to the parent iterator, a reference to the parent request buffer.

16. The method of claim 12, the method further comprising:
allocating the parent request buffer;
conveying, to the parent iterator, a reference to the parent request buffer;
causing a request to allocate the request child buffer to be sent to the child iterator; and
receiving, from the child iterator, a reference to the request child buffer.

17. The method of claim 12, the method further comprising:
causing a request to allocate the other request child buffer to the other child iterator; and
receiving, from the other child iterator, a reference to the other request child buffer.

* * * * *